US007044498B2

(12) United States Patent
Chen

(10) Patent No.: US 7,044,498 B2
(45) Date of Patent: May 16, 2006

(54) REHABILITATION STROLLER

(75) Inventor: Shun-Min Chen, Taipei Hsien (TW)

(73) Assignee: Wonderland Nurserygoods Co., Ltd., (TW)

( * ) Notice: Subject to any disclaimer, the term of this patent is extended or adjusted under 35 U.S.C. 154(b) by 160 days.

(21) Appl. No.: 10/614,960

(22) Filed: Jul. 8, 2003

(65) Prior Publication Data

US 2005/0006879 A1 Jan. 13, 2005

(51) Int. Cl.
*B62B 7/06* (2006.01)

(52) U.S. Cl. ...................................... 280/642; 280/650

(58) Field of Classification Search ................ 280/642, 280/644, 647, 648, 650, 657, 658, 47.4, 47.38; 297/354.1, 354.12, 363, DIG. 4; 188/19, 188/20

See application file for complete search history.

(56) References Cited

U.S. PATENT DOCUMENTS

| | | | | |
|---|---|---|---|---|
| 1,861,958 | A * | 6/1932 | Gallinant | 188/20 |
| 3,138,400 | A * | 6/1964 | Reid | 297/19 |
| 3,379,450 | A * | 4/1968 | Jones et al. | 280/657 |
| 3,459,435 | A * | 8/1969 | Garner | 280/644 |
| 4,116,464 | A * | 9/1978 | Haley | 280/647 |
| 4,265,466 | A * | 5/1981 | Kassai | 280/648 |
| 4,529,219 | A * | 7/1985 | Shamie | 280/642 |
| 4,834,415 | A * | 5/1989 | Yee | 280/644 |
| 5,669,625 | A * | 9/1997 | Jane Cabagnero | 280/647 |
| 5,765,665 | A * | 6/1998 | Cheng et al. | 188/20 |
| 5,871,227 | A * | 2/1999 | Huang | 280/642 |
| 6,086,086 | A * | 7/2000 | Hanson et al. | 280/650 |
| 6,105,997 | A | 8/2000 | Watkins | |
| 6,113,128 | A | 9/2000 | Watkins | |
| 6,575,492 | B1 * | 6/2003 | Davidson | 280/647 |

* cited by examiner

*Primary Examiner*—Frank Vanaman
(74) *Attorney, Agent, or Firm*—Gauthier & Connors LLP

(57) ABSTRACT

A rehabilitation stroller comprises a handrail portion, a front leg portion, a seat and rear leg portion and a backrest portion. The backrest portion is connected to the handrail portion by a clip and an adjusting member such that an angle of the backrest portion with respect to the handrail portion is adjustable. The clip is connected to the backrest portion and the adjusting member connects the handrail portion with the clip by passing through one of a plurality of holes provided in the clip. The backrest portion comprises a frame fixing hook disengageably connected to the seat and rear leg portion and a side blocking tube connected between the clip and the frame fixing hook. A braking device is provided between a pair of rear wheels provided at the seat and rear leg portion.

8 Claims, 8 Drawing Sheets

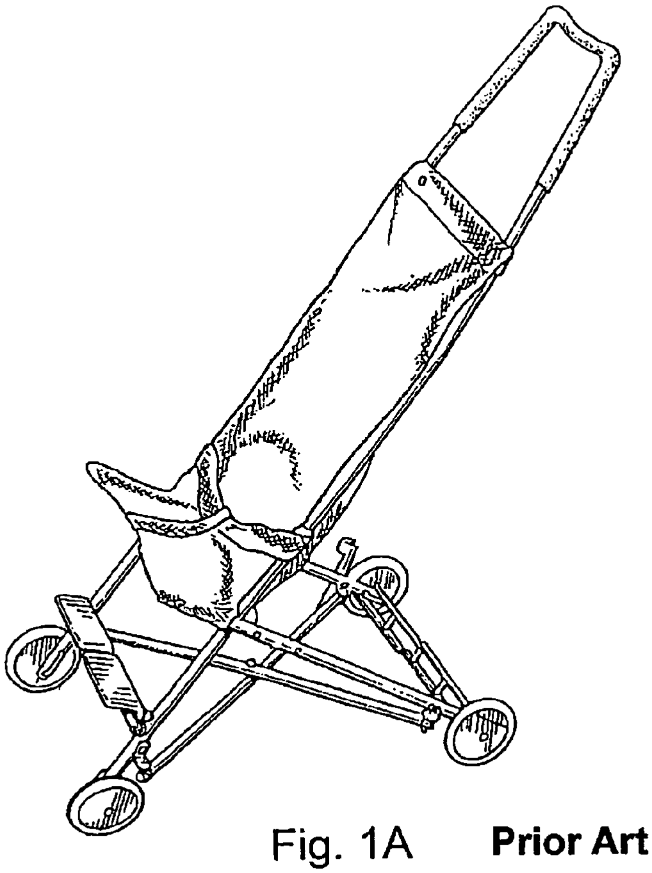
Fig. 1A Prior Art
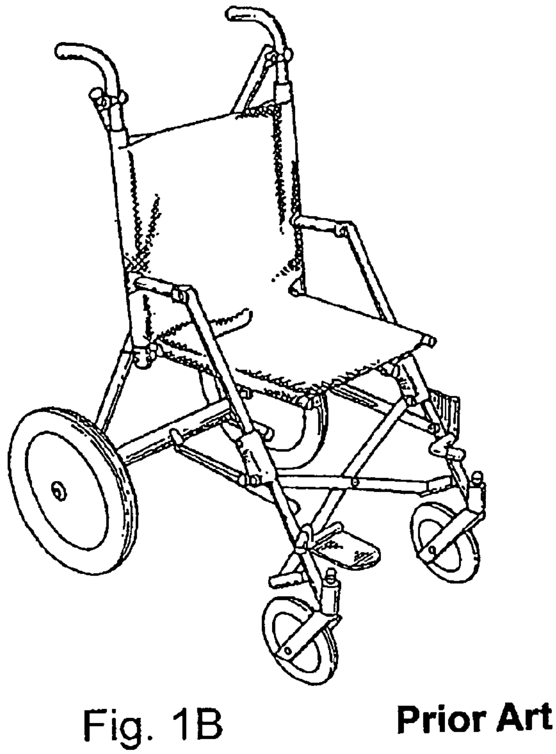
Fig. 1B Prior Art

REHABILITATION STROLLER

FIELD OF THE INVENTION

The present invention relates to a multi-function rehabilitation stroller, and in particular to an improved rehabilitation stroller which allows a user to adjust a backrest portion of the stroller, to fold the stroller easily and to stop the stroller by simply stepping on a braking device.

BACKGROUND OF THE INVENTION

Various rehabilitation strollers have been developed for wounded or sick infants.

For example, U.S. Pat. No. 6,105,997 discloses a rehabilitation stroller, as shown in FIG. 1A, which can be folded to a minimum volume but the backrest of the stroller cannot be adjusted. Besides, this kind of stroller is not provided with any shelf for accommodating articles. Thus, it is inconvenient to operate the stroller for an adult having articles in his/her hands.

U.S. Pat. No. 6,113,128 discloses another rehabilitation stroller, as shown in FIG. 1B. With this kind of stroller, a user can adjust the angle between the seat and the backrest. However, the complicated structure of the adjusting device increases both the manufacturing cost and the total weight of the stroller.

SUMMARY OF THE INVENTION

An object of this invention is therefore to provide an improved rehabilitation stroller, which is provided with a shelf for accommodating articles and a sunshade. The user can adjust the backrest portion of the stroller, fold the stroller to a minimum volume easily and safely stop the stroller by simply stepping on a braking device. Further, as the stroller of this invention has a relatively simple structure, the total weight and cost of the stroller are greatly reduced.

According to one aspect of this invention, a rehabilitation stroller is provided, which mainly comprises a backrest portion, a handrail portion, a seat portion, a front leg portion, a shelf portion and a rear leg portion. The backrest portion is connected to the handrail portion by backrest adjusting bolts on both sides and the handrail portion is connected to the front leg portion at first pivoting points by bolts on both sides. The front leg portion is connected to the shelf portion at second pivoting points by rivets on both sides and the shelf portion is connected to the rear leg portion at third pivoting points by rivets on both sides. The rear leg portion is integrally welded to the seat portion. The backrest portion is also provided with a frame fixing hook on each side. The frame fixing hook has one end pivotally connected to the backrest portion by a rivet and the other end provided with an open slot by which the frame fixing hook is engaged with a frame supporting projection welded on the rear leg portion so as to fix the frame of the stroller. When a user intends to fold the stroller of this invention, he only needs to laterally draw out a T-shaped copper sleeve received in a closed slot provided in the frame fixing hook on each side, and then the frame fixing hook can be moved forwardly to disengage from the frame support projection, thereby folding the frame of the stroller to a minimum volume.

According to another aspect of this invention, the handrail portion is provided with a plurality of backrest adjusting holes for adjusting the angle of the backrest portion with respect to the handrail portion. The backrest portion is connected to the handrail portion on each side by the backrest adjusting bolt passing through one of the holes.

According to another aspect of this invention, a braking device is provided between a pair of rear wheels connected to the rear leg portion. The braking device comprises a braking assembly for each of the rear wheels and an elastic wire movably and pivotably connected between the braking assemblies. Each braking assembly includes a braking drum and a braking plate. The braking plate is provided with a lower blocking tab and a boss having an upper blocking tab. When the elastic wire is held against the upper blocking tabs and compressed by the bosses, opposite free ends of the wire are spaced apart from the braking drums, respectively, and when the wire is caused to pivot, by being stepped on by the user, for example, from the upper blocking tabs to the lower blocking tabs, the opposite free ends of the wire are inserted into the braking drums, respectively, to brake the stroller.

According to another aspect of this invention, the backrest portion is connected to the handrail portion by a clip and an adjusting member such that an angle of the backrest portion with respect to the handrail portion is adjustable. The clip is connected to the backrest portion through a side blocking tube and the frame fixing hook and the adjusting member connects the handrail portion with the clip by passing through one of a plurality of holes provided in the clip. The disengagements of the left and right frame fixing hooks from respective frame fixing projections are simultaneously controlled by a link cooperating with two springs such that the folding of the stroller can be carried out with one hand or foot.

BRIEF DESCRIPTION OF THE DRAWINGS

The structure, features and functions of this invention will be described in detail with reference to the accompanying drawings, in which:

FIG. 1A is a perspective view showing a conventional rehabilitation stroller;

FIG. 1B is a perspective view showing another conventional rehabilitation stroller;

DETAILED DESCRIPTION OF PREFERRED EMBODIMENTS

Selected embodiments of this invention will now be described with reference to the accompanying drawings.

Figure 2:
FIG. 2 is a perspective view showing a rehabilitation stroller of this invention.
Figure 3:
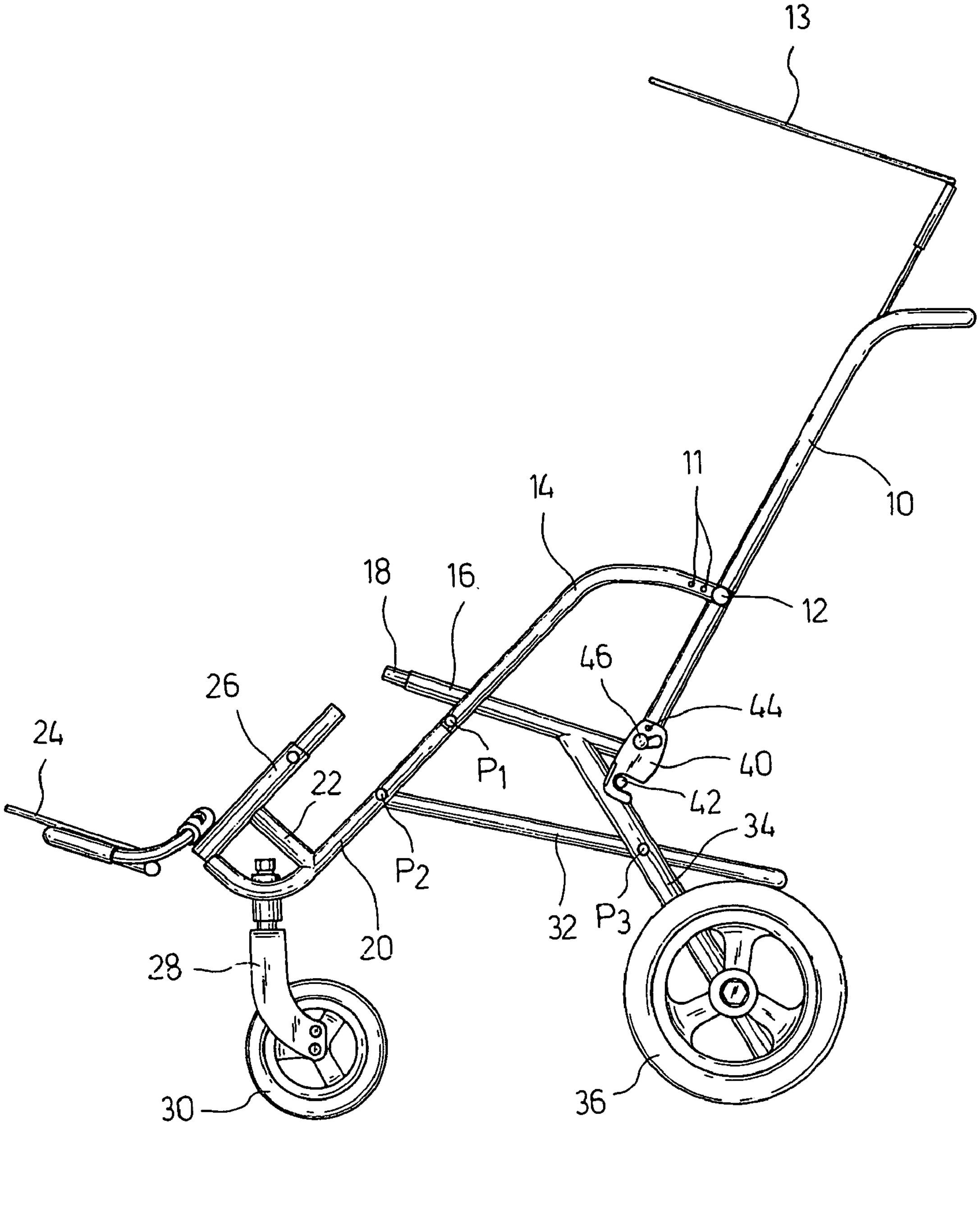
FIG. 3 is a schematic side view showing the frame of the rehabilitation stroller of this invention in the unfolded state.
Figure 4:
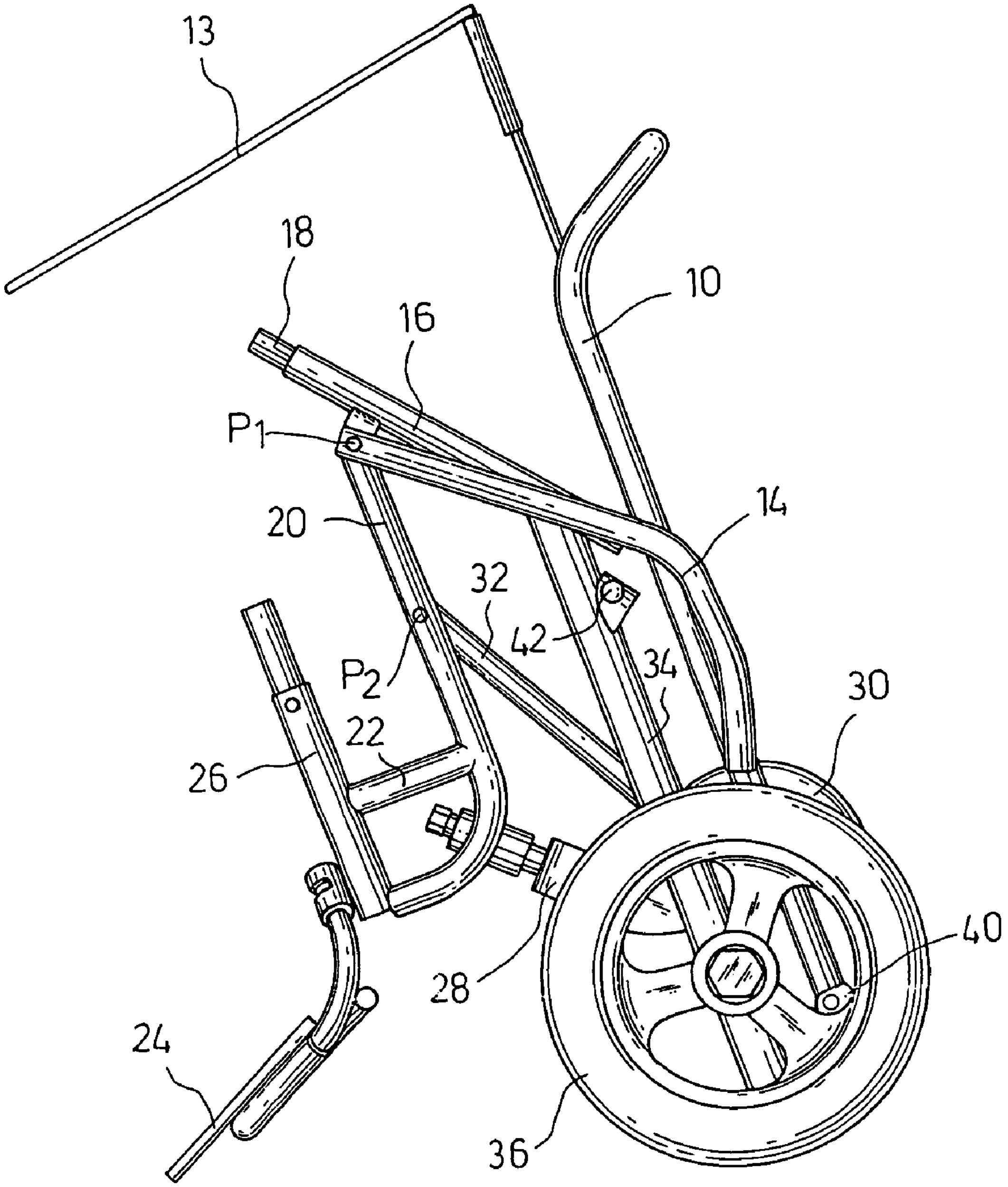
FIG. 4 is a schematic side view showing the frame of the rehabilitation stroller of this invention in the folded state.

FIG. 2 shows a preferred embodiment of a rehabilitation stroller of this invention, and FIGS. 3 and 4 schematically show the frame of the rehabilitation stroller of FIG. 2 in unfolded and folded states, respectively. In view of the symmetrical structure of the frame of the stroller, only the left portion of the frame with reference numerals of elements thereof is shown in the drawings and accordingly described in the following.

As shown in FIG. 3, the rehabilitation stroller of this invention mainly comprises a backrest portion 10, a handrail portion 14, a seat portion 16, a front leg portion 20, a shelf portion 32 and a rear leg portion 34. The backrest portion 10 is connected to the handrail portion 14 by a backrest adjusting bolt 12 and the handrail portion 14 is connected to the front leg portion 20 at a first pivoting point P1 by a bolt. The front leg portion 20 is connected to the shelf portion 32 at a second pivoting point P2 by a rivet and the shelf portion 32 is connected to the rear leg portion 34 at a third pivoting point P3 by a rivet. The rear leg portion 34 is integrally welded to the seat portion 16. The backrest portion 10 is also provided with a frame fixing hook 40 on each side. The frame fixing hook 40 has one end pivotally connected to the backrest portion 10 by a rivet 44 and the other end provided with an open slot by which the frame fixing hook 40 is engaged with a frame supporting projection 42 welded on the rear leg portion 34 so as to fix the frame of the stroller. When a user intends to fold the stroller, he only needs to laterally draw out a T-shaped sleeve 46 received in a closed slot provided in the frame fixing hook 40, and then the frame fixing hook 40 can be moved forwardly to disengage from the frame supporting projection 42, thereby folding the frame to a minimum volume. This folding operation will be described in detail later.

As shown in FIG. 3, the handrail portion 14 is provided with a plurality of (e.g., three) backrest adjusting holes 11 for adjusting the angle of the backrest portion 10 with respect to the handrail portion 14. The backrest portion 10 is connected to the handrail portion 14 by the backrest adjusting bolt 12 selectively passing through one of the backrest adjusting holes 11. The upper free end of the backrest portion 10 is bent to form a grip portion and a sunshade frame 13 extends from the bent portion of the backrest portion 10, to which a pillow and a sunshade may be attached to thereby provide a more comfortable environment for sitting. The seat portion 16 is internally provided with a seat inner tube 18 which is telescopically received in the seat portion 16 such that the length of the seat portion can be adjusted based on the demands of the infant sitting thereon. A pedal support 22 is welded to the front leg portion 20 in the vicinity of the lower free end of the front leg portion 20 and is provided with a pedal lifting assembly 26 to which a pedal 24 is pivotally connected. The height of the pedal 24 from the ground can be adjusted by sliding an inner member of the pedal lifting assembly 26, to which the pedal 24 is connected, with respect to an outer member of the assembly 26 connected with the pedal support 22. Once a suitable height of the pedal 24 from the ground is reached, the user inserts a bolt (not shown) through corresponding holes provided in the inner and outer members of the pedal lifting assembly 26 to fix the desired height. A bent portion of the lower free end of the front leg portion 20 is provided with a front wheel support 28 on which a front wheel 30 is rotatably mounted. A shelf for accommodating articles may be attached to and suspended from the shelf portion 32. When the user has articles in his hands, he can conveniently put the articles in the shelf to leave his hands free to operate the stroller.

Figure 5A:
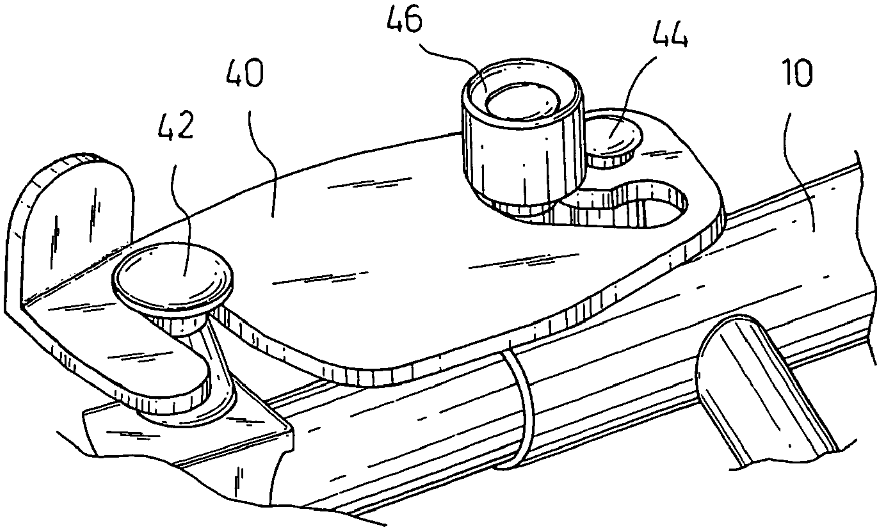
FIG. 5A is a perspective view showing a frame fixing hook and associated members of the rehabilitation stroller of this invention, in which the frame fixing hook is engaged with a frame supporting projection of a rear leg portion.
Figure 5B:
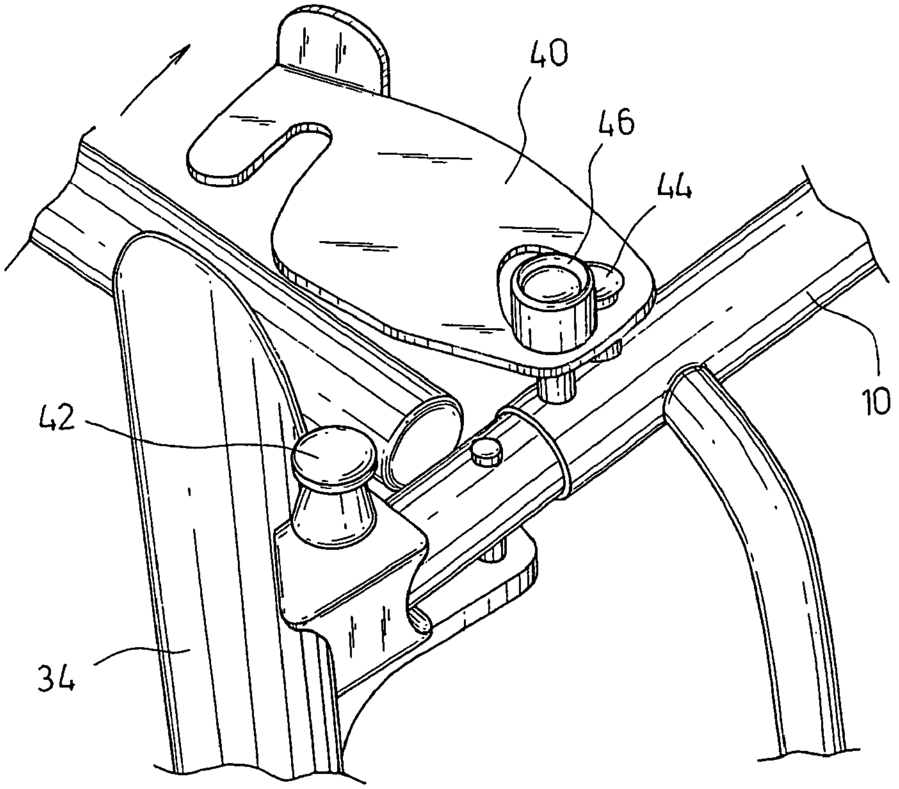
FIG. 5B is a perspective view showing the frame fixing hook and associated members of the rehabilitation stroller of this invention, in which the frame fixing hook is disengaged from the frame supporting projection of the rear leg portion.

Next, the detailed structure of the frame fixing hook 40 is described with reference to FIGS. 5A and 5B. As shown in FIGS. 5A and 5B, in this embodiment, the frame supporting projection 42 is welded on the rear leg portion 34 as described above. The frame fixing hook 40 is a steel plate and has one end pivotally connected to the backrest portion 10 by the rivet 44 and the other end engaged with the frame supporting projection 42 by the open slot. The frame fixing hook 40 is also provided with a closed slot and a T-shaped copper sleeve 46. The T-shaped copper sleeve 46 is connected to the backrest portion 10 by a rivet. The closed slot has two engaging hole portions and a transition path between the two engaging hole portions. The inner diameter of each of the engaging hole portions is substantially identical to the outer diameter of the T-shaped copper sleeve 46 but the width of the transition path between the two engaging hole portions is smaller than the outer diameter of the T-shaped copper sleeve 46. Therefore, when the T-shaped copper sleeve 46 is received in either one of the engaging hole portions of the closed slot due to the biasing force of a spring (not shown) provided therein, the frame fixing hook 40 cannot pivot about the rivet 44 due to the barrier of the smaller width of the transition path to the larger diameter of the T-shaped copper sleeve 46. Only when the T-shaped copper sleeve 46 has been drawn out of the engaging hole portion of the closed slot, the frame fixing hook 40 can pivot forwardly about the rivet 44 such that the open slot thereof can disengage from the frame supporting projection 42.

Back to FIG. 3, the folding operation of the rehabilitation stroller of this invention will now be described. When the frame fixing hook 40 disengages from the frame supporting projection 42 in the above manner, the backrest portion 10 and the rear leg portion 34 are no longer connected with each other. At this time, by holding and lifting the handrail portion 14, owing to the pivotal connections at the first, second and third pivoting points P1, P2 and P3, the front leg portion 20 rotates counterclockwise and the shelf portion 32 rotates clockwise in FIG. 3. Then, the handrail portion 14 can be rotated clockwise to thereby bring the stroller to the folded state as shown in FIG. 4. Thus, it is very easy and convenient for a user to carry out the folding operation of the stroller of this invention.

Figure 6:
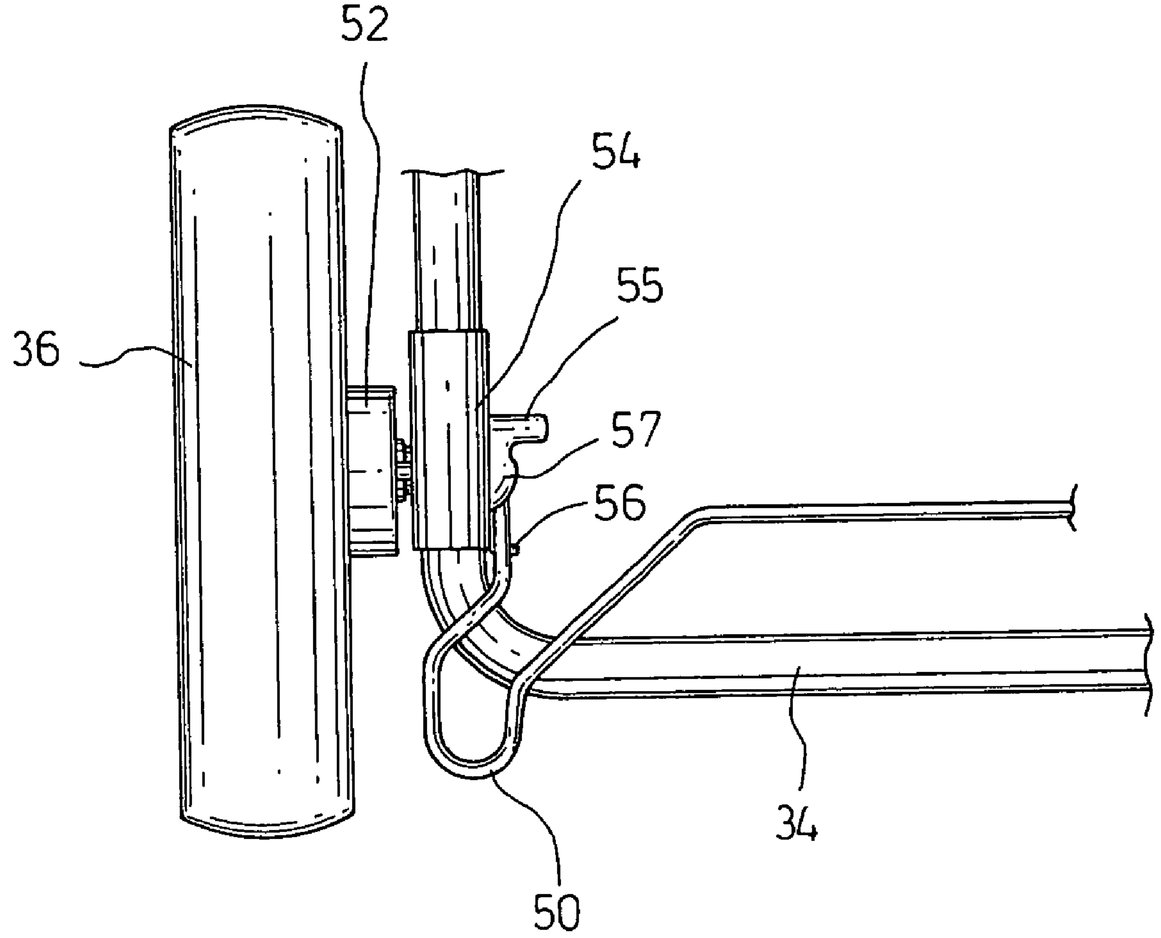
FIG. 6 is a schematic rear view showing a braking device of the rehabilitation stroller of this invention.

Next, the braking operation of the rehabilitation stroller of this invention will be described. In view of the symmetrical structures of the stroller and of the braking device, only the left portion of the braking device associated with the left rear wheel 36 is shown in FIG. 6. As shown in FIG. 6, the braking device is provided between the left and right rear wheels 36 and comprises a first (left) braking assembly for the left rear wheel 36, a second (right) braking assembly for the right rear wheel (not shown) and an elastic wire 50 arranged between the first and second braking assemblies. Each braking assembly comprises a braking drum 52 and a braking plate 54. The braking plate 54 is provided with a lower blocking tab 56 and a boss 57 having an upper blocking tab 55. The wire 50 is movably connected between the left and right braking plates 54 and pivotable between the left and right upper blocking tabs 55 and the left and right lower blocking tabs 56. When the wire 50 is held against the upper blocking tabs 55, it is subjected to an inward elastic compression by the curved surfaces of the left and right bosses 57. Thus, opposite free ends of the wire 50 remain within the braking plates 54 and are spaced apart from the braking drums 52. Therefore, the stroller is free to move. When the user intends to brake the stroller, he can simply step on the wire 50 to cause the wire 50 to pivot away from the upper blocking tabs 55 along the curved surfaces of the bosses 57 to the lower blocking tabs 56. When the wire 50 reaches the lower blocking tabs 56, since the wire 50 is no longer compressed by the curved surfaces of the bosses 57, the opposite free ends of the wire 50 extend out of the braking plates 54 and are inserted into corresponding holes provided in the braking drums 52 due to the elastic recovery force of the wire itself, thereby braking the stroller in one step.

Second Embodiment

Figure 7:
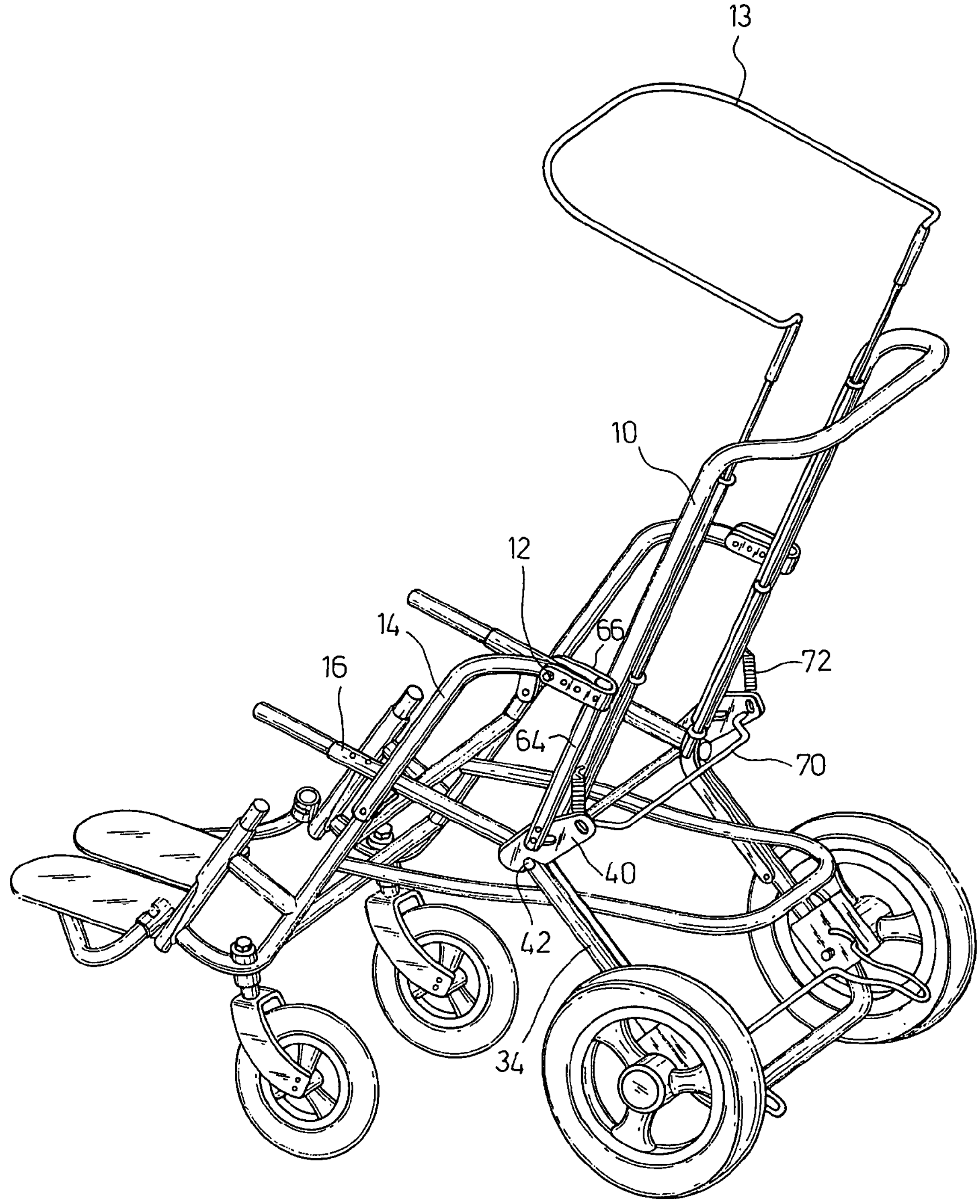
FIG. 7 is a perspective view showing a second embodiment of the rehabilitation stroller of this invention.
Figure 8:
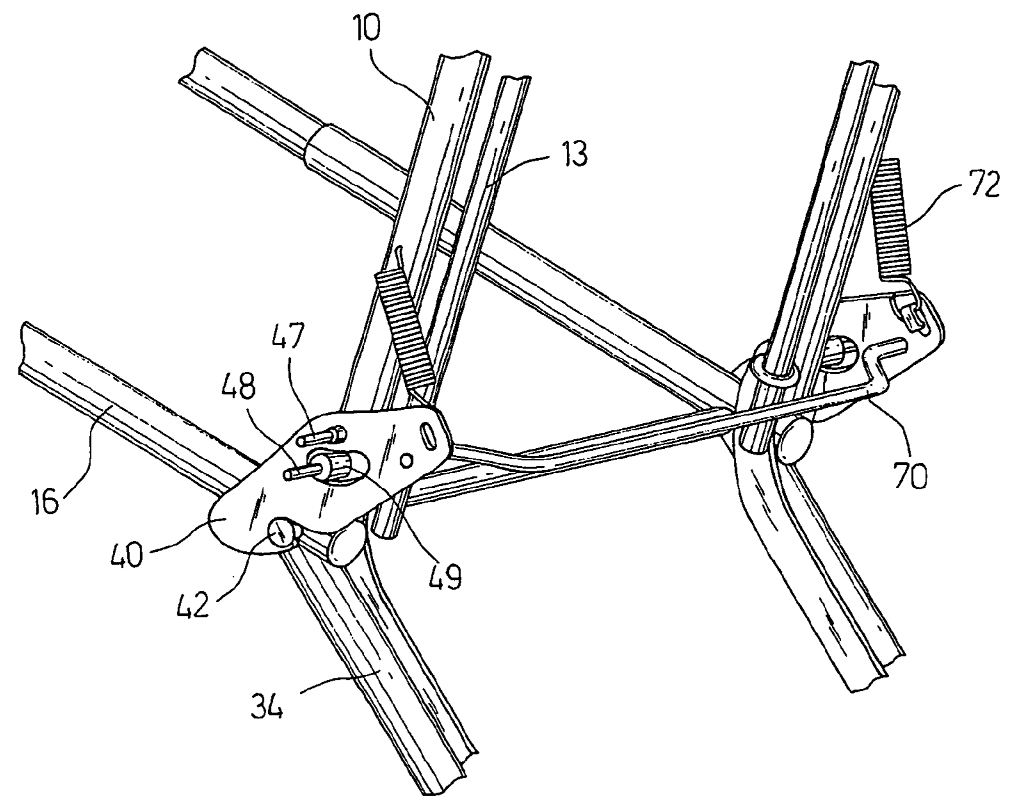
FIG. 8 is a schematic view showing a frame fixing hook and associated members of the second embodiment of the rehabilitation stroller of this invention, in which the frame fixing hook is engaged with a frame supporting projection of a seat portion and a side blocking tube is removed for the purpose of illustration.
Figure 9:
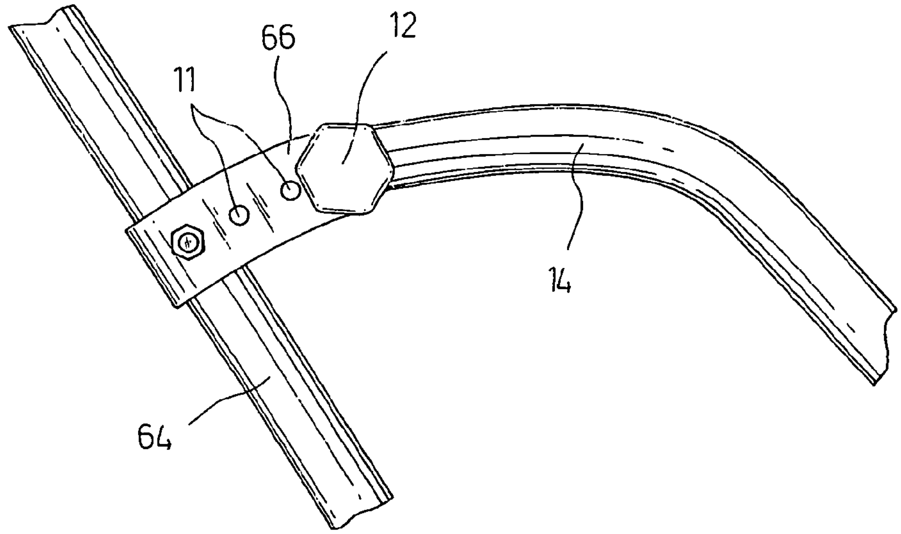
FIG. 9 is an enlarged schematic view showing the backrest adjusting arrangement of the second embodiment of the rehabilitation stroller of this invention.

Now, the second embodiment of the rehabilitation stroller of this invention will be described with reference to FIGS. 7 to 9. In view of the similarity between the first and second embodiments, only differences between the first and second embodiments will be described and parts of the second embodiment that are the same as or similar to the parts of the first embodiment are designated by the same reference numerals as those in the first embodiment.

Unlike the first embodiment, the rehabilitation stroller of this embodiment is provided with a separate sunshade frame 13 connected to the backrest portion 10 so as to increase the supporting ability of the backrest portion 10. The backrest portion 10 is additionally provided with a side blocking tube 64 such that the frame fixing hook 40 is located between the backrest portion 10 and the side blocking tube 64. Thus, the frame fixing hook 40 is limited to pivot in the gap between the backrest portion 10 and the side blocking tube 64 without any transverse displacement. The lower end of the side blocking tube 64 is connected to the backrest portion 10 and the sunshade frame 13 by a bolt 47 and an adjusting bolt 48 such that the side blocking tube 64, the backrest portion 10 and the sunshade frame 13 are held in parallel to one another. The upper end of the side blocking tube 64 is provided with a U-shaped clip 66 with opposing portions for receiving the handrail portion 14 and the side blocking tube 64 therebetween. The U-shaped clip 66 is provided with a plurality of (e.g., three) backrest adjusting holes 11 for adjusting the angle of the backrest portion 10 with respect to the handrail portion 14. The handrail portion 14 is connected to the U-shaped clip 66 by a backrest adjusting bolt 12 selectively passing through one of the holes 11. FIG. 9 is a schematic view showing the relationship among the handrail portion 14, the U-shaped clip 66 and the side blocking tube 64.

Next, the operation of the frame fixing hook 40 of the second embodiment will be described with reference to FIG. 8. Unlike the first embodiment, with the combination of a link 70 and two springs 72, the frame fixing hook 40 of this embodiment can be operated by a single hand or foot to achieve the folding of the stroller. In this embodiment, a frame supporting projection 42 is welded on the seat portion 16 and the frame fixing hook 40 is a steel plate provided with an open slot and a closed slot. The frame fixing hook 40 has one end connected to the backrest portion 10 by the spring 72 serving as a biasing member and the other end engaged with the frame supporting projection 42 by the open slot. The spring 72 is arranged to bias the frame fixing hook 40 to engagement with the frame supporting projection 42. The frame fixing hook 40 is pivotally connected at an upper middle portion thereof to the backrest portion 10 by the bolt 47 serving as a center of rotation. The closed slot of the frame fixing hook 40 provides a space for the relative movement of the adjusting bolt 48 when the frame fixing hook 40 rotates. The link 70 is arranged between and welded to the left and right frame fixing hooks 40. When folding the stroller, the user only needs to press down the link 70 to overcome the biasing force of the springs 72 so as to cause the frame fixing hooks 40 to pivot about the bolts 47 and thus to disengage from the frame supporting projections 42. Then, the stroller can be folded in substantially the same manner described in the first embodiment.

While this invention has been described according to the above embodiments, it should be understood that this invention is not limited to these embodiments. Various modifications can be carried out by those skilled in this art in view of the teaching of this disclosure without departing from the scope of this invention as defined in the appended claims.

What is claimed is:

1. A rehabilitation stroller comprising:

a handrail portion:

a front leg portion connected to said handrail portion and to a pair of front wheels: a seat and rear leg portion provided with a pair of rear wheels;

a backrest portion connected to said seat and rear leg portion, said backrest portion being adjustable connected to said handrail portion by a backrest adjusting means for adjusting an angle of said backrest portion with respect to said handrail portion;

wherein said backrest adjusting means comprises a clip connected to said backrest portion and provided with a plurality of holes and an adjusting member for connecting said handrail portion with said clip by passing through one of said holes; and wherein said backrest portion comprises a frame fixing hook disengageably connected to said seat and rear leg portion and a side blocking tube connected between said clip and said frame fixing hook.

2. A rehabilitation stroller according to claim 1 wherein said clip is substantially U-shaped with opposing portions for receiving said handrail portion therebetween.

3. A rehabilitation stroller according to claim 1 wherein said clip is substantially U-shaped with opposing portions for receiving said handrail portion and said side blocking tube therebetween.

4. A rehabilitation stroller according to claim 1 wherein said adjusting member is an adjusting bolt.

5. A rehabilitation stroller according to claim 1 wherein said seat and rear leg portion is provided with a frame supporting projection and said frame fixing hook is disengageably connected with said frame supporting projection.

6. A rehabilitation stroller according to claim 5 wherein said seat and rear leg portion includes a seat portion and a rear leg portion connected with each other, and wherein said frame supporting projection is provided on said seat portion and said pair of rear wheels is provided on said rear leg portion.

7. A rehabilitation stroller according to claim 5 wherein said frame fixing hook is pivotally connected to said backrest portion and provided with an open slot for disengageably connecting to said frame supporting projection and a biasing member connected between said backrest portion and said frame fixing hook for biasing said frame fixing hook to connection with said frame supporting projection.

8. A rehabilitation stroller comprising:

a handrail portion;

a front leg portion connected to said handrail portion and to a pair of front wheels;

a seat and rear leg portion provided with a pair of rear wheels;

a backrest portion connected to said seat and rear leg portion, said backrest portion being adjustably connected to said handrail portion by a backrest adjusting means for adjusting an angle of said backrest portion with respect to said handrail portion; and a braking means provided between said pair of rear wheels, wherein said braking means comprises:

a first braking assembly for one of the rear wheels and including a first braking drum and a first braking plate provided with a first lower blocking tab and a first boss having a first upper blocking tab;

a second braking assembly for the other of the rear wheels and including a second braking drum and a second braking plate provided with a second lower blocking tab and a second boss having a second upper blocking tab; and an elastic wire movably connected between said first and second braking plates and pivotable between said first and second upper blocking tabs and said first and second lower blocking tabs;

wherein opposite free ends of said elastic wire are spaced apart from said first and second braking drums, respectively, when said elastic wire is held against said first and second upper blocking tabs and compressed by said first and second bosses, and said opposite free ends of said elastic wire are inserted into said first and second braking drums, respectively, to brake the stroller when said elastic wire is caused to pivot from said first and second upper blocking tabs to said first and second lower blocking tabs.

* * * * *